June 3, 1930.     C. J. BOCK     1,761,968
TIRE CARRIER
Filed Sept. 14, 1927
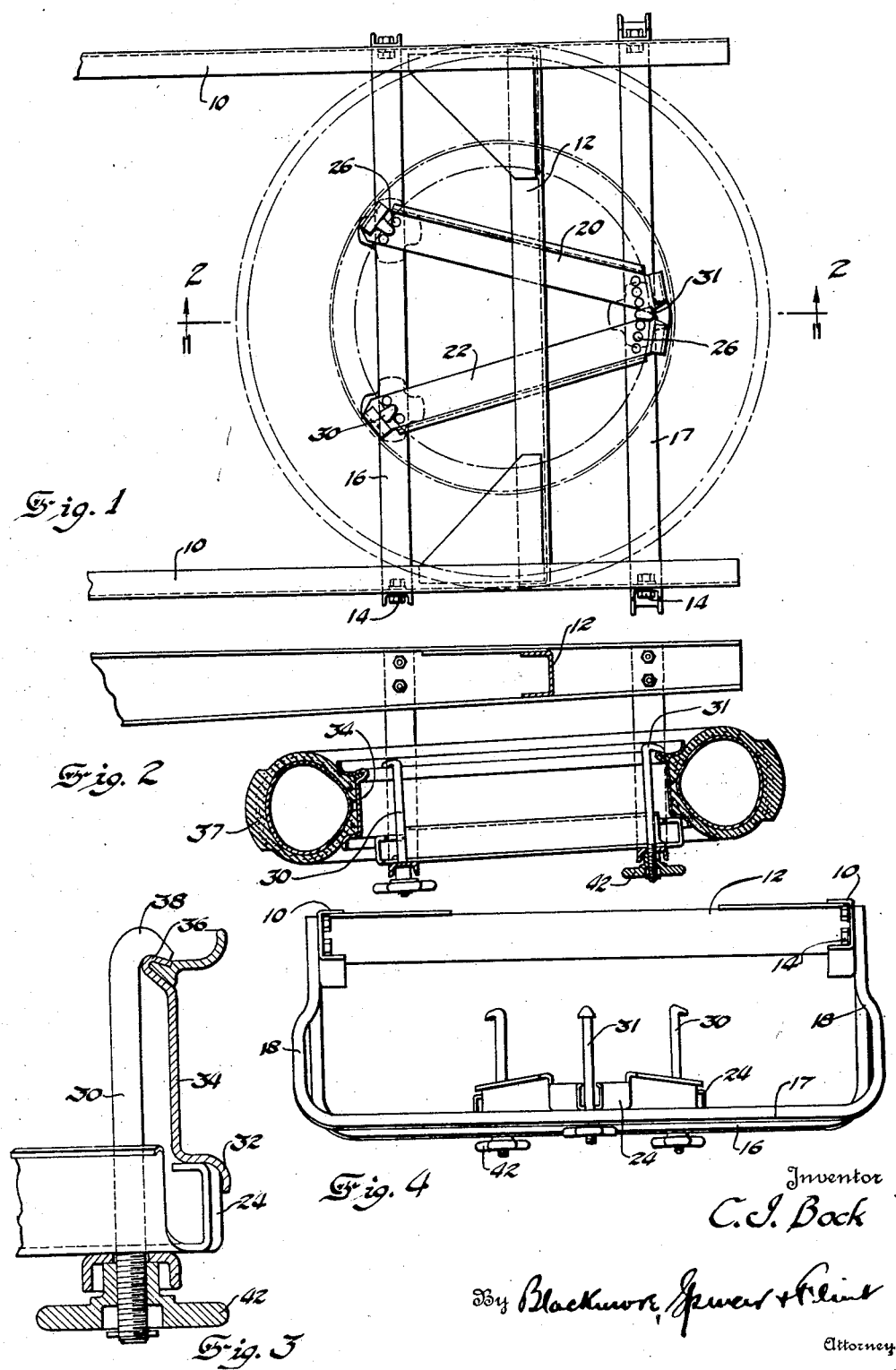
Inventor
C. J. Bock
By Blackmore, Spencer & Flint
Attorney Patented June 3, 1930

1,761,968

UNITED STATES PATENT OFFICE

CARL J. BOCK, OF PONTIAC, MICHIGAN, ASSIGNOR TO YELLOW TRUCK AND COACH MANUFACTURING COMPANY, OF PONTIAC, MICHIGAN, A COMPANY OF MAINE

TIRE CARRIER

Application filed September 14, 1927. Serial No. 219,486.

This invention relates to a support for a spare rim and inflated tire on an automotive vehicle and is particularly adapted for use with truck or other heavy type vehicles.

It is an object of this invention to provide an underslung support for a spare rim and tire so that they may be supported under the body of the vehicle. More specifically it is an object of the invention to provide a support rigidly supported from the chassis underneath the body of the vehicle so that the spare rim and tire will be held firmly in position. It is a further object of this invention to provide such a support which is convenient to the operator and from which the spare rim and tire can be easily and readily removed or replaced.

Other objects and advantages of the invention will appear in the course of the following description, taken in connection with the accompanying drawing and appended claims.

In the drawing:

Figure 1 is a plan view.

Figure 2 is a section on the line 2—2 of Figure 1.

Figure 3 is a detail view, partly in section, of the clamping rod and associated parts.

Figure 4 is a rear elevation of my improved rim and tire support.

Referring to the drawing, the numeral 10 indicates the side frame members of a conventional chassis, connected and braced by the usual transverse member 12. Fixed to the outer sides of the frame members by means of bolts 14 are two depending U-shaped supporting bars 16 and 17, the rear bar 17 being bent outward, as at 18, for permitting entrance of the rim 34 carrying the inflated tire 37. The front bar 16 extends straight down from the side frame members 10 so that an inflated tire which will just clear the bent out portions 18 will be limited in its forward movement by the side portions of the front bar 16. As the bars are originally the same size, this arrangement causes the horizontal portion of the front bar to be below the horizontal portion of the rear bar, thus causing the tire and rim to have a tendency to move forward rather than rearward.

Mounted on the bars 16 and 17 are the forwardly diverging brace bars 20 and 22, each being provided at each end with a reversely bent flange 24. Each end of the bars 20 and 22 is provided with three holes corresponding with a like number in the respective bar 16 or 17 for the reception of rivets 26. The rivets are omitted from the central holes of the two forward groups to allow passage of the clamping bolts 30. An aperture is provided in the bar 17 between the converged ends of the bars 20 and 22 for reception of the rear clamping bolt 31.

The support is so shaped and arranged that a rim and tire may be readily slid along a ledge, formed by bending over the edge of the vertically extending portion of the bars 20 and 22, into such position on the support that the lower flange 32 of the rim 34 rests on and is centered by the flanges 24. The clamping bolt is provided with a bent end 38 which fits over the flange 36 of the rim and a ring nut 42 is provided for fixing the bolt firmly in place. The structure described provides a firm three point support on which the rim and the inflated tire 37 may be rigidly mounted but from which they may be readily removed and replaced. It will be readily seen that by supporting the rim directly on the flange 24, there is no possibility of the tire becoming chafed.

I claim:

An underslung tire carrier for supporting a tire and rim in a substantially horizontal position beneath a vehicle frame, comprising supporting bars connected with an extending below the frame, diverging positioning bars of angular shape secured to said supporting bars and having their upper edge extending horizontally to form a ledge on which the tire may be slid when being placed in the carrier, the ends of said positioning bars being bent upwardly and horizontally to form supporting portions for the rim slightly below said ledge.

In testimony whereof I affix my signature.

C. J. BOCK.